Feb. 8, 1966 J. W. HART 3,234,400

SENSE AMPLIFIER WITH TUNNEL DIODE FOR CONVERTING BIPOLAR INPUT TO TWO LEVEL VOLTAGE LOGIC OUTPUT

Filed Jan. 31, 1962 2 Sheets-Sheet 1

INVENTOR.
JOSEPH W. HART

BY Charles R. Lepchinsky
AGENT

INVENTOR.
JOSEPH W. HART
BY
Charles R. Lepchinsky
AGENT

United States Patent Office 3,234,400
Patented Feb. 8, 1966

3,234,400

SENSE AMPLIFIER WITH TUNNEL DIODE FOR CONVERTING BIPOLAR INPUT TO TWO LEVEL VOLTAGE LOGIC OUTPUT

Joseph Wayne Hart, Audubon, Pa., assignor to Burroughs Corporation, Detroit, Mich., a corporation of Michigan Filed Jan. 31, 1962, Ser. No. 170,078
5 Claims. (Cl. 307—88.5)

This invention relates to a sense amplifier and more particularly to a sense amplifier that utilizes a two terminal bistable semiconductor device having a negative resistance characteristic to transform a bipolar input signal into a two level voltage logical signal.

Conventional memory systems such as ferrite cores have maximum frequency characteristics that limit the speed of the memory system. Ferrite cores while capable of operating at rates to 500 kc. require excessive amounts of power at these and higher frequencies, due to hysteresis losses. Attempts to obtain greater operating speeds by using smaller cores requiring less power have met with basic difficulties with respect to the practicability and cost of interwiring the small elements. New memory systems having higher operating speeds have been developed to meet the higher operating speeds of present digital computing systems. Some of these new systems such as deposited magnetic thtin film have a high frequency bipolar output signal comprising small magnitude randomly occurring discontinuous positive and negative pulses. Because most digital computers employ binary logic, it becomes necessary to transform these high frequency bipolar output signals into two level voltage logic signals.

Accordingly, an object of the present invention is a sense amplifier that transforms a bipolar input signal into a two level voltage logic signal.

Another object is eliminating low level noise in the output of a sense amplifier.

A further object of this invention is to provide a high frequency sense amplifier.

Still another object of this invention is to improve sense amplifiers.

These and other objects are accomplished in the present invention by utilizing a two terminal semiconductor bistable device to transform bipolar signals from a source such as a deposited magnetic thin film into two voltage level logic signals. More specifically bipolar signals including asynchronously occurring discontinuous positive and negative pulses are amplified by a high frequency amplifier. The amplified signals are applied to a voltage divider which includes a two terminal semiconductor bistable device having one impedance value in one stable state and a second different impedance value in the other stable state. The amplified bipolar signals have sufficient amplitude to switch the two terminal semiconductor bistable device between its two stable states. Once the two terminal bistable device is switched into a stable state by one polarity of the bipolar pulses it remains in that stable state until it is switched into the other stable state by a reverse polarity pulse. Because the two terminal bistable device has a separate impedance value for each of its two stable states, the voltage drop across it is determined by which stable state it happens to be in. This causes the voltage seen across the bistable device to be a two voltage level logic signal representative of the bipolar signal. This two voltage level logic signal is amplified to a sufficient magnitude to be utilized by logic systems such as a digital computer.

The exact nature of this invention as well as other objects and advantages thereof will be readily apparent from consideration of the following detailed description relating to the annexed drawings in which.

Figure 1:
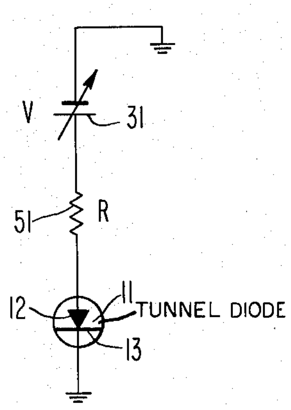
FIGURE 1 shows a typical biasing arrangement for a tunnel diode.

Referring now to FIGURE 1 there is shown a semiconductor bistable device such as a tunnel diode 11, having its cathode 13 return to ground and its anode 12 connected through a resistor 51 to a source of positive potential 31. The D.C. characteristic curve of the tunnel diode 11 is illustrated as curve 71 in FIGURE 2 wherein the vertical coordinate corresponds to increasing current and the horizontal coordinate corresponds to increasing voltage. Reference to the D.C. characteristic curve of the tunnel diode shown in FIGURE 2 indicates that as the voltage across the tunnel diode is increased from zero, the current through the tunnel diode also increases until a peak is reached at point B. Further increasing the voltage causes the current through the tunnel diode to decrease until point A is reached after which the current again increases with increasing voltage. It is clear that between points A and B the tunnel diode exhibits a negative resistance because as the voltage across the tunnel diode is increased the current through the diode decreases. This negative resistance portion of the tunnel diode characteristic is an unstable region, if the total circuit positive resistance is larger than the negative resistance of the tunnel diode. That is, if the resistance 51 shown in FIGURE 1 is larger than the magnitude of the negative resistance of the tunnel diode 11, then the negative resistance portion of the tunnel diodes characteristic will be an unstable region.

The low voltage or "OFF" state of the tunnel diode is the region from 0 volts to the voltage needed to raise the current to the peak value shown at point B. In this region the current through the tunnel diode consist entirely of majority carriers transported across the junction of the tunnel diode by the tunneling mechanism. The high voltage or "ON" state of the tunnel diode is considered to be the region from the value of voltage needed to cause the tunnel diode to operate at the valley or low current region at point A to the peak voltage applied to the tunnel diode. The speed of switching between the "ON" and "OFF" states is very high and is determined chiefly by the junction capacitance of the tunnel diode and the amount of charge available from the triggering pulse.

Figure 2:
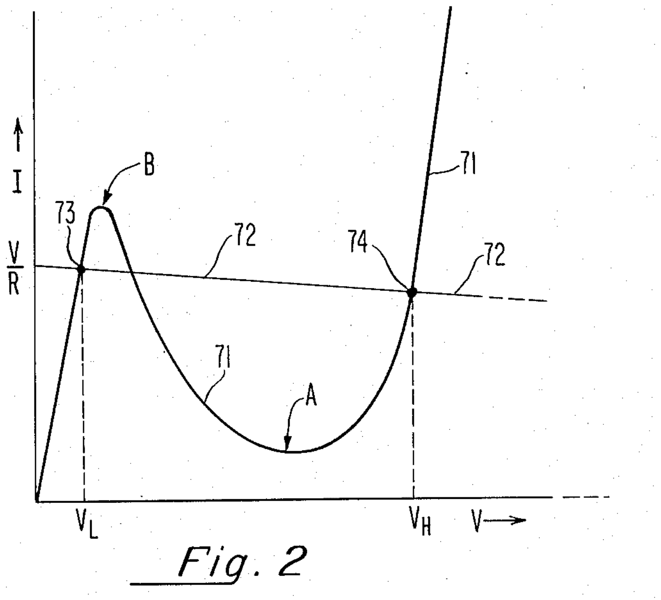
FIGURE 2 shows a typical D.C. characteristic curve of a tunnel diode.

The load line of the tunnel diode is indicated in FIGURE 2 as line 72. This load line is determined in the same manner as for a vacuum tube. A point is located on the vertical or current axis that is equal to the supply voltage divided by the circuit resistance. For the circuit shown in FIGURE 1 this would be a current value on the vertical axis equal to the value of the voltage supplied by the battery 31 divided by the resistance 51. A point (not shown) is then taken on the horizontal or voltage axis equal to the supply voltage, which in the case of FIGURE 1, would be the magnitude V of the voltage supplied by the battery 31. A straight line drawn between these two points will give the load line for the tunnel diode circuit. Reference to FIGURE 2 shows that the load line 72 intersects the low voltage or "OFF" state of the tunnel diode at point 73 and intersects the high voltage or "ON" state of the tunnel diode at point 74. Point 73 and 74 are the two stable operating points of the tunnel diode, and as explained below they give the tunnel diode a bistable characteristic. Point 73 corresponds to a voltage magnitude across the tunnel diode of $V_L$, and point 74 corresponds to voltage magnitude across the tunnel diode of $V_H$. When the tunnel diode is in the stable state represented by point 73 it has a voltage drop across it equal to $V_L$. When in the other stable state denoted by point 74 it has a voltage drop across it equal to $V_H$. Reference to FIGURE 2 shows that regardless which stable state the tunnel diode happens to be in the change of current through the tunnel diode is very small after it is switched into the other stable state. These are the residual bias current levels of the tunnel diode. This is due to the load line having a small slope, i.e. it is almost horizontal. However, a relatively large fluctuation in the voltage seen across the tunnel diode occurs between the two stable states which is equal to $V_L$ minus $V_H$. This is because when in one stable state the tunnel diode has a impedance value that is different than the impedance it has in the other stable state. Stable point 73 is the low impedance state and stable point 74 is high impedance state. When the tunnel diode is resting at the stable point 73 it has a relatively small voltage drop across it of the magnitude of $V_L$. However, when it is at stable point 74, for a slightly less value of current, it has a much larger voltage drop across it of the magnitude of $V_H$ because of its higher impedance in the second stable state 74.

If the tunnel diode should be resting at stable point 73 and a positive voltage pulse is applied to the anode 12 of the tunnel diode, whose amplitude is sufficient to move the operating point of the tunnel diode to the right of the peak current value of point B, the tunnel diode operating point will be moved into the negative resistance region between points A and B. There being no stable rest point in this region forces the tunnel diode to seek its stable state at point 74. After the pulse is removed the tunnel diode remains in the stable state at point 74, and further application of positive pulses will always leave the tunnel diode at its stable rest point 74.

If a negative pulse is applied to the tunnel diode that has sufficient amplitude to move its operating point to the left of the low current point or valley at point A, the tunnel diode operating point will again be in the negative resistance region which is unstable. This region being unstable will force the tunnel diode to seek the stable state at point 73. If additional negative pulses are then applied to the tunnel diode, the operating point always returns to the stable state at point 73. It becomes clear then, that the tunnel diodes switches only if its operating point is moved into the negative resistance region between points A and B. When this occurs the tunnel diode will then seek the stable rest point it is being driven towards.

Figure 3:
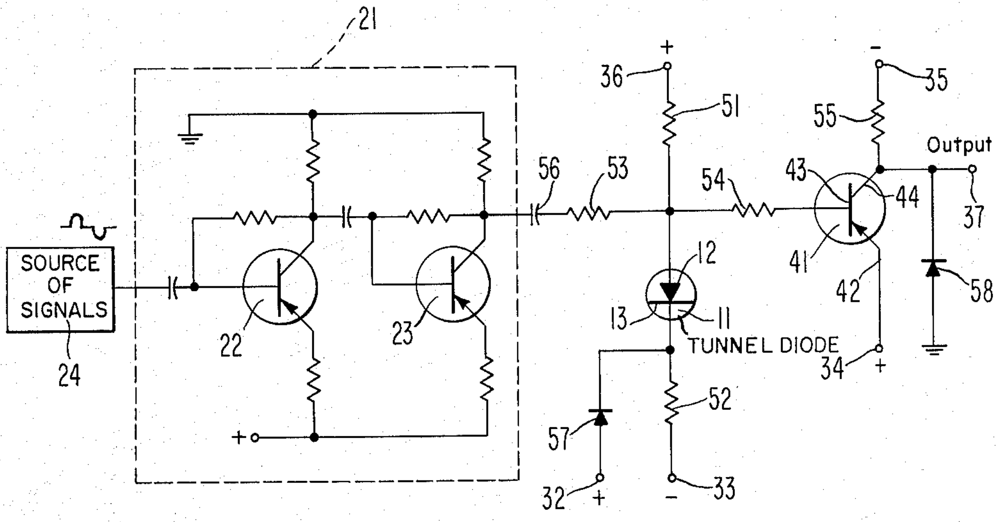
FIGURE 3 shows a preferred embodiment of the present invention.

These and other properties of the tunnel diode are incorporated in the present invention, an embodiment of which is illustrated in FIGURE 3. Reference to FIGURE 3 shows a source of bipolar signals 24 including randomly or asynchronously occurring discontinuous positive and negative pulses as is illustrated in FIGURE *4a*. These signals are coupled to and amplified by the high frequency amplifier 21. FIGURE 3 shows the high frequency amplifier 21 comprising a plurality of semiconductor amplifying devices such as transistors 22 and 23. It is to be understood this invention is not limited to the type of amplifier shown in FIGURE 3, for any amplifier can be used. It is only necessary that an amplifier having the proper gain and frequency characteristic be utilized. The gain required for the amplifier 21 is determined by the magnitude of the signals provided by the signal source 24 and how much these signals must be amplified for them to have a sufficient amplitude to switch the tunnel diode between its stable states. The bandwidth requirement for the amplifier 21 is determined by the frequency characteristic of the input signal supplied by the signal source 24. It is to be understood that in the event the magnitude of the signals supplied by the signal source 24 have sufficient magnitude to properly switch the tunnel diode 11, then the amplifier 21 is unnecessary and the signals from the signal source may be coupled directly to the anode 12 of the tunnel diode. The output of the amplifier 21 is coupled through a capacitor 56 and current limiting resistor 53 to a voltage divider including resistor 51 and tunnel diode 11. The tunnel diode 11 has its cathode 13 coupled to a negative source of potential 33 through a resistor 52. The junction of the cathode 13 with the resistor 52 is connected through a diode 57 to a positive source of potential 32. Voltage divider resistor 51 also has one of its terminals connected to a positive source of potential 36. The voltage developed across the tunnel diode 11 is applied to the base 43 of transistor 41 by way of the current limiting resistor 54. Transistor 41 operates as a switch or amplifying means. That is, the voltage developed across the tunnel diode 11 turns off the transistor 41 or causes it to conduct in the saturation region.

Figure 4:
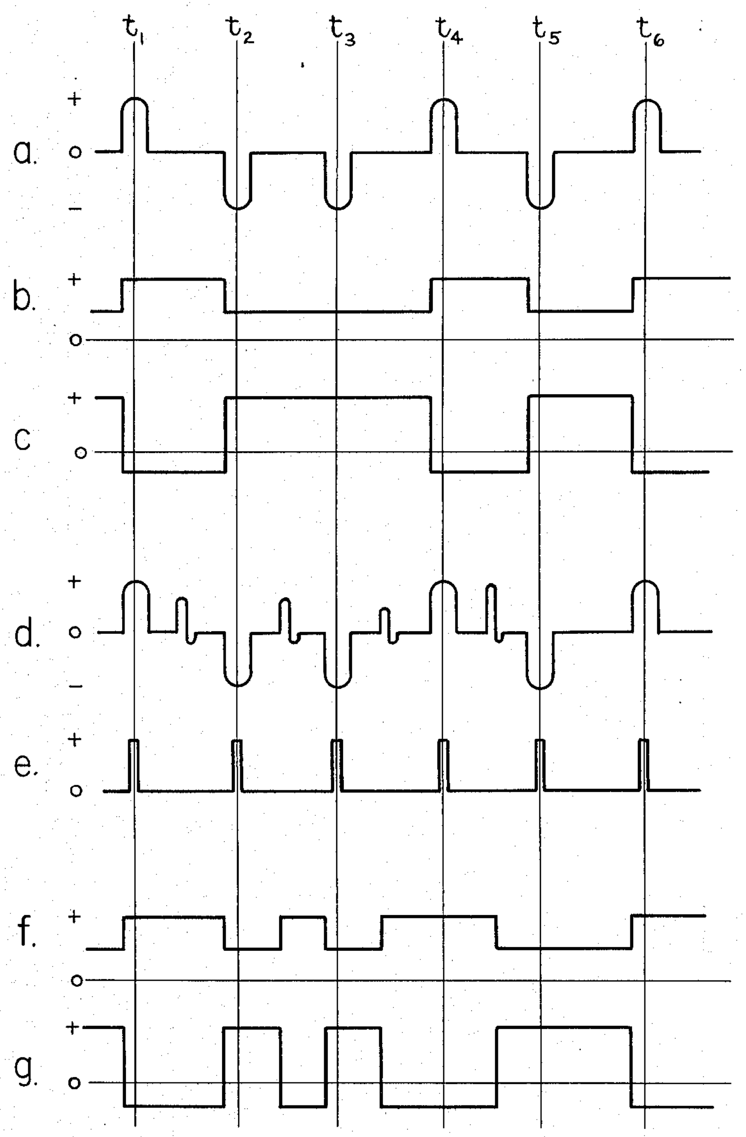
FIGURE 4 shows typical ideal wave shapes at various points throughout the circuit shown in FIGURE 3.

Assume now that a signal is applied to the amplifier 21 from the source of signals 24 which corresponds to the input signal shown in FIGURE *4a*. Reference to FIGURE *4a* shows that this signal comprises randomly occurring discontinuous positive and negative pulses which includes a positive going pulse that occurs at time $t_1$, a negative going pulse which occurs at time $t_2$, a second negative pulse which occurs at time $t_3$, a positive pulse occurring at time $t_4$, a negative pulse at time $t_5$ and a positive pulse at time $t_6$. If the source of signals 24 is a thin film memory, the positive and negative pulses, shown in FIGURE *4a*, will have an amplitude of approximately 6 millivolts. These signals then must be amplified by the amplifier 21 in order that they have sufficient amplitude to switch the tunnel diode 11 from one stable state to the other. Assume now that tunnel diode 11 is in its low voltage or "OFF" stable state, that is, it is resting at point 73 of its D.C. characteristic curve shown in FIGURE 2. When the first positive pulse is applied to the anode of the tunnel diode 11, its operating point will be moved to the right of the peak current point that occurs at point B and the tunnel diode 11 will be switched to its high voltage or "ON" stable state at point 74. After the positive pulse is removed, the tunnel diode 11 will remain in its second stable point 74, until the occurrence of the negative pulse which occurs at time $t_2$. At time $t_2$ the negative pulse will cause the tunnel diode operating point to move to the left of point A the low current or valley point and the tunnel diode will seek its resting point at stable state 73 where it will remain until a positive pulse occurs. Reference to FIGURE 4 shows that at time $t_3$ a second negative pulse occurs. This negative pulse cannot cause the tunnel diode to move to the second stable state at point 74 because the negative pulse moves the tunnel diode operating point to the left of point 73. Therefore the tunnel diode will return to stable point 73 until time $t_4$ when a positive pulse is applied which moves the operating point in the negative resistance region between points A and B, causing the tunnel diode to seek its resting point at point 74. At time $t_5$ the tunnel diode is again switched back to its low voltage stable state point 73 due to the negative pulse that occurs at time $t_5$. As the bipolar input signals switch the tunnel diode 11 between its two stable states, a two voltage level signals is developed across the tunnel diode 11. The two voltage levels correspond to $V_L$ and $V_H$ respectively.

The resistor 52 and the diode 57 operate as a voltage biasing means which clamps the cathode of the tunnel diode 11 at a fixed potential. This fixed potential is chosen such that when the tunnel diode 11 is in its low voltage or first stable state 73 the sum of the voltage seen on the cathode 13 of the tunnel diode and the voltage dropped across the tunnel diode 11 biases the base 43 of transistor 41 in a forward direction causing the transistor 41 to conduct in the saturation region. When tunnel diode 11 is switched into the high voltage or second stable state 74 the summation of the voltage across the tunnel diode and the reference potential on the cathode of the tunnel diode is sufficient to render the transistor 41 non-conducting. Transistor 41 being alternating cut-off and conducting in the saturation region causes a two voltage level logic signal to appear on the output terminal 37 in the collector 44 circuit of the transistor 41. Accordingly, a bipolar input signal applied to the anode of tunnel diode 11 is transformed into a small magnitude two voltage level logic signal which is applied to the base 43 of the transistor 41 and is amplified by the transistor 41. Diode 58 which is connected to the output terminal 37 of transistor 41 clamps the output voltage of the transistor 41 to approximately zero volts. For example, assume that the summation of the voltage across the tunnel diode 11 and the reference voltage seen on the cathode of tunnel diode 11 is sufficient to render the transistor 41 non-conducting. The collector 44 potential of transistor 41 would then tend to be the value of the negative source of potential 35. However, any negative voltage on the collector of the transistor 41 will cause the diode 58 to conduct. This will cause the output voltage level on terminal 37 to be slightly more negative than zero volts by the amount of the voltage drop across the diode 58. This is shown in FIGURE 4*c* which shows the output signals seen on terminal 37 as being slightly more negative than ground when taransistor 41 is non-conducting. When transistor 41 is conducting in the saturation region due to the voltage level seen across the tunnel diode, the transistor 41 will be essentially a short circuit and the output voltage will very nearly equal the positive voltage seen on the emitter 42. In one embodiment of this invention that was constructed, this was chosen to be approximately plus 3 volts which is a sufficient amplitude of output signal to operate other logic circuits.

Low level noise signals do not have sufficient amplitude to switch the tunnel diode 11 from one stable state into the other. Therefore, the output signal does not contain any such low level noise signals. FIGURE 4*d* shows the identical input signal shown in FIGURE 4*a* with the addition of noise signals appearing between the bipolar positive and negative pulses. Referring now to FIGURE 4*d*, the initial positive pulse will cause the tunnel diode 11 to be switched to the second or high voltage stable state 74. The positive signal occuring between time $t_1$ and $t_2$, although of sufficient magnitude to switch the tunnel diode, does not cause the tunnel diode to switch because it is already in the high voltage or second stable state. Accordingly, the tunnel diode will not switch to its first or low voltage stable state 73 until the occurrence of the negative bipolar signal appearing at time $t_2$. A positive noise signal occurs between time $t_2$ and $t_3$ which is of sufficient amplitude to switch the tunnel diode. This positive noise signal causes the tunnel diode to switch to the high voltage or second stable point 74 and the negative pulse occurring subsequently at time $t_3$ switches it back to its low voltage or first stable state 73. Again between time $t_3$ and $t_4$ a positive noise pulse occurs which switches tunnel diode 11 from its low voltage or first stable state 73 to its second or high stable state 74. Accordingly, the tunnel diode is in the second stable state at the occurrence of the positive pulse which occurs at time $t_4$. Since the tunnel diode is already in its second stable state at time $t_4$, the positive pulse will not change the stable state of the tunnel diode.

Reference to FIGURES 4*b* and 4*f*, which is the voltage developed across the tunnel diode 11 for the case of an input signal containing no noise and when an input signal occurs having noise signals of sufficient amplitude to switch the tunnel diode respectively, shows that at times $t_1$, $t_2$, $t_3$, $t_4$, $t_5$ and $t_6$ the time at which the bipolar pulses occur, the output voltage level across the tunnel diode 11 is the same for each case. That is, at the different time intervals during which the bipolar pulses occur, the voltage across the tunnel diode 11 is the same regardless if the input signal contains noise signals of sufficient magnitude to switch the tunnel diode from one stable state to the other. Accordingly, if the output signal from the sense amplifier can be sensed at certain time intervals such as $t_1$, $t_2$, $t_3$, $t_4$ etc. it is of no consequence that the tunnel diode has been switched by noise signals. Techniques for doing this are well known in the art and are not described here because they do not constitute a part of the present invention. FIGURE 4*e* shows a series of positive occurring pulses that occur during a portion of the time interval that the bipolar positive and negative pulses occur. By using a strobbing circuit (not shown) the positive pulses shown in FIGURE 4*e* can be used to detect the output voltage level which corresponds to the bipolar positive and negative pulses. The change in the output signal caused by noise sufficient to switch the tunnel diode 11 will then be eliminated. It is to be understood that if the source of signals 24 provides a signal input free of noise signals having sufficient amplitude to switch the tunnel diode then sensing the output voltage level at times corresponding to the occurrence of the bipolar input signals is unnecessary. FIGURES 4*g* and 4*c* show the output signal as amplified by the transistor 41. It should be noted that the output pulses appearing on terminal 37 are the inverse of the voltage levels appearing across the tunnel diode 11.

The circuit shown in FIGURE 3 was constructed and tested with satisfactory results using component values given below, it being understood that the present invention is not limited by or to such values which are given as examples only:

| | |
|---|---|
| Amplifier **21** | Gain of 38 db and bandwidth of 15 mc. |
| Capacitor **56** | 2 mfd. |
| Resistor **51** | 3.9K ohms. |
| Resistor **52** | 300 ohms. |
| Resistor **53** | 100 ohms. |
| Resistor **54** | 100 ohms. |
| Diode **57** | T6. |
| Diode **58** | T6. |
| Tunnel diode **11** | 1N2941. |
| Transistor **41** | 2N501. |
| Potential source **32** | +3.0 volts. |
| Potential source **33** | −3.0 volts. |
| Potential source **34** | +3.0 volts. |
| Potential source **35** | −3.0 volts. |
| Potential source **36** | +12.0 volts. |

Obviously many modifications and variations of the present invention are possible in the light of the above teachings. It is therefore to be understood that within the scope of the appended claims the invention may be practiced otherwise than as specifically described.

What is claimed is:

1. A bipolar-to-binary signal voltage converter comprising a tunnel diode having an anode and a cathode terminal, input means to receive a bipolar signal voltage connected to said anode terminal, tunnel diode biasing means also connected to the anode terminal of the tunnel diode for bistable operation thereof in response to a bipolar signal input voltage to said input means, a PNP transistor having an input, an output and a common electrode, said input electrode connected to the anode terminal of the tunnel diode, said tunnel diode being further connected in a poled direction between a polarized power source and said transistor input electrode to provide the transistor with a current bias, said cathode terminal of the tunnel diode connected to a positive terminal of a fixed voltage source and said common electrode of the transistor connected to a fixed voltage source which is more positive than that connected to the tunnel diode cathode terminal by an amount substantially equal to the high voltage stable operating state of said tunnel diode, and output means connected to the output electrode of said transistor.

2. A bipolar-to-binary signal voltage converter comprising a tunnel diode and a transistor, said tunnel diode having an anode electrode and a cathode electrode, the anode electrode being commonly connected to an input means and to a biasing means for bistable voltage operation of said tunnel diode, said transistor having a base electrode connected to the anode electrode of said tunnel diode, an emitter electrode connected to a first positive voltage source and a collector electrode connected through a binary signal output means to a negative voltage source, said tunnel diode cathode electrode being connected to a second positive voltage source, said first positive voltage being more positive than said second positive voltage source by an amount substantially equal to the high voltage stable state of said tunnel diode.

3. A bipolar-to-binary signal voltage converter comprising a tunnel diode, a tunnel diode input means to receive a bipolar input signal and a tunnel diode biasing means commonly connected to said tunnel diode to provide a bistable voltage level across said tunnel diode when it is responsively activated by said bipolar signal voltage, a transistor amplifier operative as an OFF-ON switch, having an input electrode means also commonly connected to the junction of said tunnel diode and its biasing means, and an output means to provide a binary signal output voltage in response to the application of the bistable voltage levels of said tunnel diode to said amplifier input electrode means, said tunnel diode being connected to the input electrode means of said transistor amplifier to simultaneously apply thereto a first stable voltage level for the activation of said amplifier and to provide a conduction path of low impedance through said tunnel diode for the bias current of said transistor amplifier initiated by said activation, and to further apply thereto a second stable voltage level to inactivate said amplifier and provide a conduction path of high impedance to the input electrode means of said amplifier during its periods of inactivation.

4. A bipolar-to-binary signal voltage converter comprising a PNP transistor having at least a base and an emitter electrode, a tunnel diode having an anode and a cathode, a common junction point, means commonly connecting said junction point to the base electrode, to the anode electrode, to an input terminal for receiving the bipolar signal voltage, and to a biasing potential source for said tunnel diode including an impedance means selected for bistable operation of said tunnel diode, a transistor biasing potential means interconnecting said cathode electrode and said emitter electrode, and having a magnitude and polarity sufficient to forward-bias the emitter-base electrodes of the PNP transistor and of a voltage value substantially equal to the stable high voltage level of said tunnel diode.

5. A bipolar-to-binary signal voltage converter comprising a transistor of a selected conductivity type with a base, emitter and collector electrode, a first voltage reference source connected to said emitter electrode, a tunnel diode and a biasing means including a first impedance serially connected to one end of the tunnel diode, a second voltage reference source connected to the other end of said tunnel diode and a third voltage reference source connected to said first impedance for biasing the tunnel diode for bistable operation, means connecting the common junction between said tunnel diode and said first impedance to said base electrode, and a second impedance connected between a fourth voltage reference source and said collector electrode, said tunnel diode being poled with relation to the emitter-to-base diode of said transistor so as to provide a current path between said first and said second voltage reference sources when said tunnel diode is in its low-voltage, high current, stable operating state and said transistor is in a high-conduction operating state, input means also connected to the common junction of the tunnel diode and the first impedance for receiving a bipolar signal voltage and output means connected to said collector electrode for providing an inverted binary output signal.

References Cited by the Examiner

UNITED STATES PATENTS 3,170,073 2/1965 Kovanic et al. ------ 307—88.5

OTHER REFERENCES

Amodei et al.: "Nondestructive Tunnel Diode Memory Cell," in RCA Technical Notes RCA TN No. 468, September 1961, sheets 3–4 and FIG. 6 relied on.

Publication "Utilizing Esaki Diode Latches," by I. G. Akmenkains in IBM Technical Disclosure Bulletin, vol. 3, No. 8, dated January 1961, pp. 38–39.

DAVID J. GALVIN, *Primary Examiner.*

ARTHUR GAUSS, *Examiner.*